Sept. 23, 1969    M. C. BURK ETAL    3,468,157
ACOUSTICAL APPARATUS FOR DETECTING THE COMPOSITION OF A GAS
Filed March 3, 1966

INVENTORS
M. C. BURK
L. B. ROOF
BY
Young and Quigg
ATTORNEYS

United States Patent Office 3,468,157
Patented Sept. 23, 1969

3,468,157
ACOUSTICAL APPARATUS FOR DETECTING THE COMPOSITION OF A GAS
Marvin C. Burk and Lewis B. Roof, Bartlesville, Okla., assignors to Phillips Petroleum Company, a corporation of Delaware
Filed Mar. 3, 1966, Ser. No. 531,531
Int. Cl. G01n 31/00
U.S. Cl. 73—24                                            5 Claims

ABSTRACT OF THE DISCLOSURE

Apparatus for detecting the composition of gas comprising an acoustical chamber with a pair of spaced transducers, an oscillator for passing the signal to one of the transducers, variable frequency oscillator for establishing a second signal and means to mix the output of the variable frequency oscillator with the output of the first oscillator and with the output of the second transducer and a phase angle null detector between the mixed signals for adjusting the variable frequency oscillator.

---

This invention relates to apparatus for detecting the composition of a gas. In one aspect, this invention relates to apparatus for detecting changes in the compositions of the gases which issue from a chromatograph column of adsorbent material. In another aspect, this invention relates to acoustical apparatus for detecting a change in the composition of a gas in response to a change in the acoustical properties of the gas.

A variety of different techniques and systems have been employed to detect changes in the compositions of the several different gas streams which issue from a gas chromatograph. One such technique involves passing a gas mixture through one acoustic resonator and the same mixture less one of its components through another acoustic resonator. Each of the resonators is then made to produce an acoustical signal the frequency of which is a function of the compositions of the gases within the resonators. These frequencies can be compared and their differences used as an indication of the gas compositions.

One of the shortcomings with this type of system is its low sensitivity. The acoustical change which results from a change in the gas composition is usually too low to be of any significance. This undesirable result can be attributed primarily to the low frequencies of the signals which have heretofore been employed. If the frequency of the acoustical signal is increased in order to achieve more sensitivity, it becomes extremely difficult if not impossible to detect any change or delay in the signal.

According to this invention, these and other disadvantages of the acoustical apparatus for detecting the composition of a gas are overcome by means of high frequency signals and an electrical system which will detect a small change or delay in the frequency of the signal. The magnitude of the change or delay of the signal is representative of the gas composition.

This is accomplished by means of a system including an acoustical chamber having a first transducer and a second transducer spaced therefrom. A gas transmission means in the form of an inlet conduit and an outlet conduit is connected to the acoustical chamber in a manner which will allow a gas to be passed through the chamber between the spaced transducers. An oscillator means capable of producing a first electrical signal of high frequency is electrically connected to the first transducer such that the output signal from the oscillator means will cause the first transducer to emit acoustical vibrations in the form of a high frequency acoustical signal or wave which will travel across the chamber to the second transducer. A variable frequency oscillator means and a first mixer means are connected in a manner which will allow a second electrical signal to be generated by and passed from the variable frequency oscillator means to the first mixer means. The first mixer means is also electrically connected to the second transducer so that a third electrical signal established by the second transducer in response to the acoustical waves can be transmitted to the first mixer means. The third electrical signal will be delayed in time an amount proportional to the delay experienced by the acoustical waves in passing through the gas between the spaced transducers. The third electrical signal can be amplified if desired before being passed to the first mixer means. The first mixer means functions to establish a fourth electrical signal representative of the difference between the second and third electrical signals.

A second mixer means is electrically connected to the oscillator means to receive the first electrical signal as it passes to the first transducer. The second electrical signal is also passed to the second mixer means in a manner which allows the second mixer means to compare the first and second signals and to establish a fifth signal representative of the difference therebetween. A delay line means having a fixed delay is electrically connected to the second mixer means to receive the fifth signal and to establish a sixth signal delayed in time relative to the fifth signal.

A phase angle null detector means is electrically connected to the first mixer means, the fixed delay line means, and the variable frequency oscillator means. The phase angle null detector means functions to eliminate the phase angle difference between the fourth and sixth signals by establishing a seventh signal representative of the differences in the phase angles of the fourth and sixth signals. The seventh signal, in the form of a voltage, is applied to the variable frequency oscillator means to regulate the second signal in a manner which balances the phase angle delay of the sixth signal, due to the control of the second signal passed to the second mixer means, with the phase angle delay of the fourth signal, the latter signal being delayed due to the delay of the acoustic signal in passing through the acoustical chamber. A suitable indicator-recorder connected to the electrical conductor carrying the sixth signal will indicate the degree of control necessary to balance the phase angle delays of the fourth and sixth signals.

The second electrical signal, transmitted to the first and second mixer means from the variable frequency oscillator means, is representative of the composition of the gas flowing through the acoustical chamber. Thus, the phase angle delay of a signal for a known gas can be compared to the phase angle delay of a signal for an unknown gas or to the phase angle delay of a signal due to a change in the composition of a gas which is passed through the acoustical chamber. Either of these comparisons will indicate the composition of the gas flowing through the acoustical chamber.

Accordingly, it is an object of this invention to provide an apparatus for detecting a change in the composition of a gas.

Another object of this invention is to provide an apparatus for employing a high frequency acoustical signal to determine a change in the composition of a gas.

A further object of this invention is to provide a sensitive apparatus for determining the composition of a gas.

These and other objects of the invention will become apparent to one skilled in the art after studying the following detailed description, the appended claims, and the accompanying drawings wherein:

Figure 1:
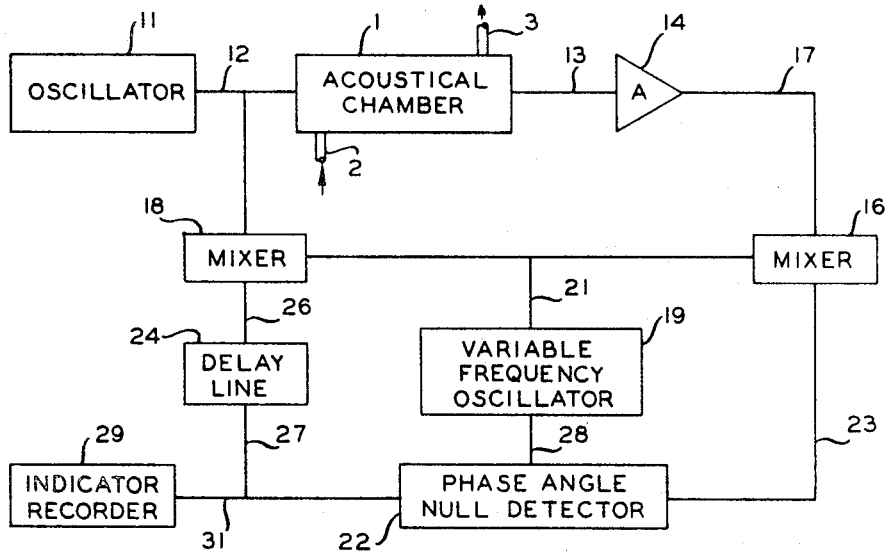
FIGURE 1 is a schematic illustration of the apparatus of the invention.

Referring now to the drawings, wherein like reference numerals are used to denote like elements, the invention will be described in more detail. Many switches, auxiliary lines, indicators, valves, and the like, not necessary in explaining the invention to one skilled in the art, have been omitted from the drawings for the sake of clarity.

An acoustical chamber 1 is provided with gas conducting means including a gas inlet conduit 2 and a gas outlet conduit 3 for passing a gas through the chamber. The chamber 1 can be constructed of any suitable material such as plastic or other material inert to the gas.

Figure 2:
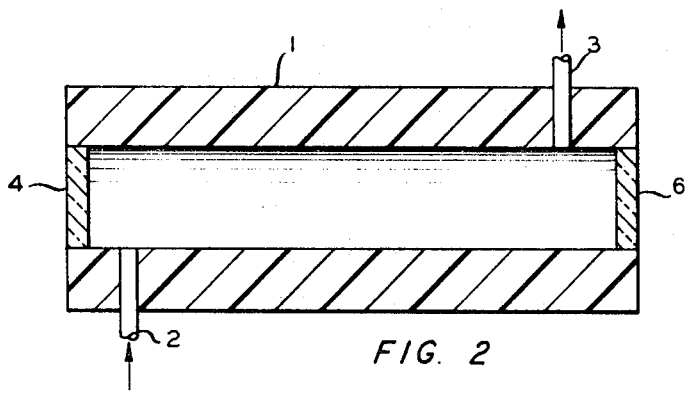
FIGURE 2 is a cross section of the acoustical chamber of this invention.
Figure 3:
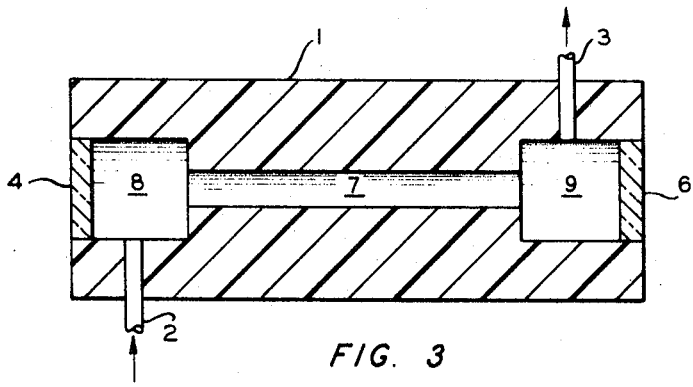
FIGURE 3 is a cross section of an alternate embodiment of the acoustical chamber of the invention.

Referring more particularly to FIGURES 2 and 3, the acoustical chamber 1 is provided with a first transducer 4 and a second pickup transducer 6 spaced therefrom. The transducers 4 and 6 can be of any type well known in the art. Transducer 4 is constructed such that it will generate vibrations in response to an electrical signal applied to it. Transducer 6 is constructed such that it will pick up or detect acoustical vibrations and generate an electrical signal in response thereto. The piezoelectrical transducers disclosed in copending commonly assigned application Ser. No. 500,022, now Patent No. 3,365,593, can be employed if desired. Another transducer crystal which can be used is that described as Glennite ceramic transducer manufactured by Gulton Industries, 212 Durham Ave., Metuchen, N.J. These transducers are in the shape of circular disks, ¼ inch in diameter and 0.2 inch thick.

As illustrated by FIGURE 2, the acoustical chamber 1 can have a cylindrical passageway connecting the spaced transducers 4 and 6. As an alternate type of construction, as illustrated by FIGURE 3 of the drawing, the acoustical chamber includes a comparatively small cylindrical passageway 7 connecting larger cylindrical chambers 8 and 9 positioned adjacent transducers 4 and 6. The transducers 4 and 6 can be affixed by a suitable cement to the interior surface of the chambers. Alternatively, the chambers can be provided with a rim or shoulder (not shown) against which the transducers can rest.

An oscillator 11 is connected to the first transducer 4 by means of an electric lead 12. The oscillator 11 can be a fixed frequency oscillator such as the crystal oscillator Model OT-2 (range 200–5000 kc.) manufactured by The International Crystal Manufacturing Company, Inc., 18 North Lee, Oklahoma City, Okla.

Transducer 6 has an electric lead 13 attached thereto for transmitting an electrical signal generated by the transducer 6 to an amplifier means 14. A first mixer means 16 is connected to amplifier means 14 by electric lead 17. A second mixer means 18 is connected to electric lead 12. The first and second mixer means 16 and 18 can be the same as that illustrated and described in U.S. Patent 3,144,762, Testerman et al., issued Aug. 18, 1964, the disclosure of which is specifically incorporated herein.

A variable frequency oscillator 19 is connected to mixers 18 and 16 by electrical conductor 21. A variable frequency oscillator and mixer which can be used in the practice of this invention is shown in FIGURE 23.4, page 324 of Transistor Circuit Design, by Texas Instruments, Inc., published by McGraw-Hill of New York. The first mixer means 16 is connected to a phase angle null detector means 22 by an electric lead 23. A phase angle null detector which can be used for this purpose is illustrated in FIGURE 1 of U.S. Patent 2,957,137, Robinson, issued Oct. 18, 1960. The second mixer means 18 is connected to a fixed delay line means 24 by an electric lead 26. The delay line means 24 of this invention can be any fixed delay line such as a 10-microsecond delay line marketed by The Artronic Instrument Company, Silver Spring, Md., as Part No. 18H-10. The delay line means 24 is connected to the phase null detector by an electric lead 27. The phase angle null detector 22 is electrically connected to the variable frequency oscillator 19 by an electric lead 28.

An indicator-recorder 29 connected to electric lead 27 by an electric lead 31 can be used to indicate the low frequency signal delayed in time from the delay line means 24. The low frequency signal transmitted by electric lead 27 can be readily measured or detected. This signal is representative of the small changes in the high frequency signal due to a change in the gas composition in the acoustical chamber 1. The indicator-recorder 29 can be analog or digital to provide a value representative of the gas in the acoustical chamber. If desired, the indicator-recorder 29 can be connected to the electrical conductor 23 carrying the fourth signal.

The frequency of the signal in lead 21 from the variable frequency oscillator 19 can be varied by varying the capacitance of a control condenser in the circuit of the variable frequency oscillator. When the oscillator 19 is used in conjunction with the phase angle null detector 22, which establishes an electrical signal in response to a difference in the phase angles of the signals received, a voltage sensitive capacitor in the circuit of the variable frequency oscillator 19 will vary the frequency of the output signal in response to an applied voltage from the phase angle null detector. Although the frequency of the signal imparted to transducer 4 can be within a rather broad range, it is generally preferred that it be within the range of between about 1 to about 10 megacycles.

In operating the apparatus of this invention to detect a change in the composition of a gas, helium or the like is first passed through the acoustical chamber 1 and the delay of the acoustical signal in passing through the helium is balanced against the delay imparted to the signal in lead 28 by controlling the signal in lead 21 in response to a signal from the phase angle null detector 22. By adjusting the output signal of the variable frequency oscillator 19 in response to a signal from the phase angle null detector 22, the signal from the first mixer means 16 will balance or come into phase with the signal from the second mixer means 18 when the latter has been delayed by the delay line means 24.

The time of travel for an acoustical signal through the acoustical chamber can be represented by the equation $$t = d/v \tag{1}$$

where:

$t$ = time required for the acoustical signal to pass between the spaced transducers,
$d$ = distance between the spaced transducers, and
$v$ = velocity of sound in the medium within the chamber.

The time required for the signal to complete one cycle or one wave length can be represented by the equation $$t_c = 1/f \tag{2}$$

where:

$t_c$ = time for the signal to make one cycle,
$f$ = frequency of the signal, and
$1$ = one second.

The distance between the spaced transducers in wave lengths can be represented by the equation $$L_d = t/t_c \tag{3}$$

where:

$L_d$ = distance between the spaced transducer in wave lengths,
$t$ = time as defined in Equation 1, and
$t_c$ = time as defined in Equation 2.

The phase angle shift is expressed as the fraction of $L_d$ which is greater than its whole number. This can be represented by the equation $$PAS = L_d - \text{whole number of } L_d \tag{4}$$

where:

PAS=phase angle shift expressed as a fraction of a whole wave length, and $L_d$=distance as defined in Equation 3.

The frequency of the output signal of the variable oscillator 19 can be obtained from the equation $$PAS = \frac{FD}{\frac{1}{(F_1 - F_2)}} \qquad (5)$$

where:

PAS=the phase angle shift as defined in Equation 4,
FD=the fixed delay of the fixed delay line 24,
$F_1$=the frequency of the electrical signal generated by the oscillator 11 and passed to transducer 4 and second mixer means 18, and
$F_2$=the frequency of the signal from the variable frequency oscillator 19 necessary to balance the phase angle in lead 27 to equal the phase angle in lead 23.

The following example will illustrate the different output signals required from the variable frequency oscillator to balance the phase angle delays. It must be understood that this example is for the purpose of illustration only and must not be considered to be limiting of the invention.

Example

Helium is passed through an acoustical chamber having the transducers spaced 1.3 millimeters apart. The velocity of sound in helium is approximately 1000 meters per second. Applying these values to Equation 1, the time $t$ necessary for the acoustical signal to pass between the transducers is calculated to be 1.3 microseconds.

For an electrical signal from oscillator 11 of 4 megacycles, the time required for one cycle $t_c$ as determined by Equation 2 is 0.25 microsecond. The distance between the spaced transducers in wave length $L_d$ is determined from Equation 3 to be 5.2 wave lengths. The phase angle shift PAS is 0.2 wave length as determined from Equation 4.

By employing a fixed delay means having a delay of 10 microseconds and the calculated PAS of 0.2 wave length, the frequency of the signal from the variable frequency oscillator $F_2$ necessary to reach a balanced condition is calculated by Equation 5 to be 3.98 megacycles.

For a gas of unknown composition which results in a delay in time $t$ of 1.45 microseconds in passing between the spaced transducer as determined by Equation 1, the distance between the transducer $L_d$ is calculated to be 5.8 wave lengths for a signal at a frequency of 4 megacycles. From Equation 4, the phase angle shift PAS for this signal is 0.8 wave length. With a fixed delay of 10 microseconds, the frequency of the signal from the variable frequency oscillator $F_2$, as determined by Equation 5 based upon a PAS of 0.8, is calculated to be 3.92 megacycles. This frequency of the signal $F_2$ will provide the desired balanced condition in the system.

It is evident that the composition of the unknown gas can be predicted by comparing the frequency of the signal $F_2$ necessary to balance the phase angles for helium with the frequency of the signal $F_2$ necessary to balance with the unknown gas. For helium the difference in the signal of 4 megacycles in electric lead 12 and 3.98 megacycles in electric lead 21 is 0.2 megacycle or 20,000 cycles. A signal of this frequency is easily detectable and recordable. For the unknown gas the difference in the signal is 0.8 megacycle or 80,000 cycles. This comparatively low frequency signal is likewise easily detectable and can be recorded to give an indication of the composition of the gas.

Although the invention has been described in considerable detail, it must be understood that such detail is for the purpose of illustration only and that many variations can be made without departing from the spirit and scope of the invention.

We claim:

1. Apparatus for detecting a change in the composition of a gas comprising:
   (a) an acoutsical chamber having spaced first and second transducers;
   (b) means connected to said chamber for passing a gas therethrough;
   (c) oscillator means for establishing and passing a first signal to the first transducer to generate an acoustical signal which will travel across said chamber to the second transducer;
   (d) variable frequency oscillator means for establishing a second signal;
   (e) first mixer means connected to said variable frequency oscillator means and the second transducer for comparing said second signal and a third signal from the second transducer responsive to the acoustical signal and for establishing a fourth signal representative of the difference therebetween;
   (f) second mixer means connected to said oscillator means and said variable frequency oscillator means for comparing said first signal and said second signal and for establishing a fifth signal representative of the difference therebetween;
   (g) fixed delay means connected to said second mixer means for receiving said fifth signal and for establishing a sixth signal delayed in time relative to said fifth signal; and
   (h) phase angle null detector means connected to said mixer means, said fixed delay means, and said variable frequency oscillator means to control the frequency of said second signal responsive to the phase angle difference between said fourth signal and said sixth signal to adjust the phase angle of said sixth signal to equal the phase angle of said fourth signal.

2. Apparatus according to claim 1 wherein said variable oscillator includes a voltage sensitive capacitor adapted to control the frequency of said second signal in response to a voltage established by said phase angle null detector means.

3. Apparatus according to claim 1 including amplifier means connected between the second transducer and said first mixer means to amplify said third signal.

4. Apparatus according to claim 1 wherein said acoustical chamber has a cylindrical passageway between said transducers.

5. Apparatus according to claim 1 wherein said acoustical chamber includes a passageway connecting comparatively larger chambers positioned adjacent each transducer.

References Cited

FOREIGN PATENTS 798,323    7/1958    Great Britain.

OTHER REFERENCES

National Instrument Laboratories, Inc.: Bulletin 175, for Sonic Gas Analyzer, received in U.S. Patent Office April 1959. 4 pp.

An article in Review of Scientific Instruments, vol. 28, No. 11, November 1957 entitled "Sonic Gas Analyzer for Measurement of $CO_2$ in Expired Air" by F. D. Stott, pp. 914–915.

RICHARD C. QUEISSER, Primary Examiner

J. P. BEAUCHAMP, Assistant Examiner